United States Patent
Howard, Jr.

[19]

[11] Patent Number: 6,109,434
[45] Date of Patent: Aug. 29, 2000

[54] PROTECTIVE CASE FOR PORTABLE COMPUTER

[76] Inventor: William E. Howard, Jr., 169 Ridgeway Ave., Fort Thomas, Ky. 41075

[21] Appl. No.: 09/232,420

[22] Filed: Jan. 16, 1999

[51] Int. Cl.[7] .................................................. B65D 85/30
[52] U.S. Cl. ........................................... 206/320; 206/521
[58] Field of Search ............................. 312/208.1, 208.4; 206/320, 305, 521, 591, 576; 361/683

[56] References Cited

U.S. PATENT DOCUMENTS

| | | | |
|---|---|---|---|
| 5,105,338 | 4/1992 | Held | 361/683 |
| 5,160,001 | 11/1992 | Marceau | 190/102 |
| 5,214,574 | 5/1993 | Chang | 361/680 |
| 5,217,119 | 6/1993 | Hollingsworth | 206/583 |
| 5,494,157 | 2/1996 | Golenz et al. | 206/370 |
| 5,524,754 | 6/1996 | Hollingsworth | 206/320 |
| 5,607,054 | 3/1997 | Hollingsworth | 206/320 |
| 5,647,484 | 7/1997 | Fleming | 206/576 |
| 5,678,666 | 10/1997 | Shyr et al. | 190/102 |
| 5,682,993 | 11/1997 | Song | 206/320 |
| 5,725,090 | 3/1998 | Vermillion et al. | 206/320 |
| 5,762,170 | 6/1998 | Shyr et al. | 190/109 |
| 5,826,770 | 10/1998 | Chuang | 224/607 |
| 5,835,344 | 11/1998 | Alexander | 361/683 |
| 5,909,806 | 6/1999 | Fischel et al. | 206/320 |
| 5,971,148 | 10/1999 | Jackson | 206/320 |

*Primary Examiner*—Jacob K. Ackun
*Attorney, Agent, or Firm*—Bruce P. Bardes

[57] ABSTRACT

An improved protective case for a portable, or laptop, computer is described. In particular, a protective case designed such that the computer may be kept therein during transport, storage, or use, is described. The protective case provides flexible hinge means to accommodate opening and closing the computer and case while the two remained attached to each other. The protective case contains means for protecting the computer from damage that may result from physical shock. The protective case provides for convenient access to all four sides of the portable computer, where necessary user interfaces, such as cable connectors, accessory ports and disk drives, are typically found, when the protective case is open, and protection therefor when the protective case is closed.

31 Claims, 5 Drawing Sheets

PROTECTIVE CASE FOR PORTABLE COMPUTER

BACKGROUND OF THE INVENTION

1. Field of the Invention

The invention relates to an improved protective case for a portable, or laptop, computer. In particular, the invention relates to a protective case in which the computer may be kept during transport, storage, or use.

2. Background Art

The personal computer has greatly enhanced the ability of individuals to perform a variety of chores requiring numerical calculations or logical decisions. Some of the common chores in this category include word processing, spreadsheet calculations, manipulating databases, computer-assisted drafting, transmitting messages, data acquisition, and the like. While small enough to fit on a desk top, such personal computers are too bulky for convenient transporting for use at various locations. The computer industry has conquered this problem by producing a computer that is approximately 12 inches wide, 9½ inches deep and 2 inches high. At that size, it may properly be called a portable, or laptop, computer. The industry has also produced even smaller portable computers, typically called notebook, sub-notebook or palmtop computers. The principal advantage of such portable computers is that they may be carried to and used at whatever location their computing capacity is needed by the user. This may be termed field use, which frequently imposes severe physical abuse on the computer.

Although manufacturers of portable computers have endeavored to make their products durable, most portable computers are not sufficiently durable to withstand physical damage that may be encountered during transport and/or use. Cases incorporated into the design of portable computers are typically made from plastic moldings. The complex shape needed to accommodate the various internal components of the computer, and the connectors for external cables, and the like, dictate that the plastic must be readily moldable. These same considerations dictate that the plastic selected for the case must be dimensionally stable over an extended period of time. Among common engineering plastics, those plastics meeting the above requirements tend to be somewhat brittle. As a consequence, dropping an unprotected portable computer onto a hard surface may break its case and/or damage its internal components. The imaging screen is particularly susceptible to breakage.

Recognizing the vulnerability of portable computers to damage by dropping them onto hard surfaces, owners of portable computers began to use protective carrying cases. The first such cases were nothing more than attache cases or fabric bags. These cases did facilitate carrying a portable computer (and accessory devices such as connecting cables, external modems or disk drives, and the like), but they didn't offer much protection for the computer. Because an obvious need for better cases for carrying portable computers existed, an industry for producing such cases has emerged.

The art of designing and manufacturing protective cases for portable computers, as of the early 1990s, is represented by the teachings of Marceau (U.S. Pat. No. 5,160,001) and Hollingsworth (U.S. Pat. No. 5,217,119). In general terms, the protective cases described in these two patents provided means for supporting a portable computer within the case, by means of straps or slings, and means for isolating the computer from handling abuse by stiff panels, cushioning material, and pockets for carrying accessory devices and/or papers. Such cases proved effective in protecting portable computers, and a variety of improvements soon followed.

Some representative improvements are given by the teachings of Golenz et al (U.S. Pat. No. 5,494,157), Hollingsworth (U.S. Pat. No. 5,524,754), Shyr et al (U.S. Pat. Nos. 5,678,666 and 5,762,170) and Vermillion et al (U.S. Pat. No. 5,725,090). Each of the cited patents teaches that the computer must be withdrawn from the protective case before it is used. Golenz et al provide a side accessible compartment for the computer. Shyr et al provide a front accessible compartment for a computer within a suitcase or briefcase. The other patents describe top accessible compartments in their protective cases.

Another direction in which improvements in protective cases were made is the incorporation of provisions for peripheral devices for computers, notably for printers. Chang (U.S. Pat. No. 5,214,574) and Fleming (U.S. Pat. No. 5,647,484) teach such protective cases, each designed to house both a computer and a printer. In the protective cases described in these two inventions, the computer may remain partially within the case during operation; however, the imaging screen extends outside the case during operation, and this component of a portable computer is particularly vulnerable to damage.

Still another direction in which improvements were made is designing the protective case such that the computer can remain inside the case during operation. Held (U.S. Pat. No. 5,105,338), Song (U.S. Pat. No. 5,682,993) and Alexander (U.S. Pat. No. 5,835,344) have devised such protective cases. In each of these inventions, a specific portable computer and a dedicated protective case are specifically designed to function together. Neither the Held patent nor the Alexander patent describes a generic protective case that could be used with a wide variety of portable computers. The Song patent purports to describe a generic protective case, but a careful study of the teachings therein indicates otherwise. The elastic flaps for accessing cable connectors and battery compartments must clearly be tailored for the locations of those features on each computer for which such a protective case might be made. Also, Song specifically teaches that the arrangements of clips used to retain the computer within the protective case must be mated to corresponding features on the case of the computer itself. However, the most serious problem with Song's teaching concerns the probable inoperability thereof. In mechanical engineering terminology, the upper and lower trays of Song's protective case and the upper and lower portions of the computer itself constitute a four-bar linkage. The four bars are connected by the retaining clips and two hinges, one at the rear of the protective case and the other within the computer itself. If these elements are dimensioned in according with the closed aspect of the computer and the protective case, it is physically impossible to open the case without moving the rear of the keyboard portion of the computer housing from the rear of the lower tray of the case and without moving the rear of the display screen portion of the computer housing from the rear of the upper tray of the case. This is the essential nature of four-bar linkages having links of different lengths. This essential consideration, not addressed anywhere in the Song patent, is an important feature of the present invention.

Hollingsworth (U.S. Pat. No. 5,607,054) has described a folio carrying case for a portable computer. When closed, this case protects the top and bottom, and front and back surfaces of a computer. It provides minimal protection to the left and right sides of the computer. When opened, this case offers no protection to the lid of the computer, which is particularly vulnerable to damage, should the computer slide from the user's lap during operation.

Chuang (U.S. Pat. No. 5,826,770) discloses a protective case that includes an inner tray. During transit, the inner tray nests inside the bottom of the case, and provides a storage compartment for the computer and accessory devices. To set up the computer for use, the inner tray must be emptied, turned over and replaced inside the case, and the computer then installed on what was originally the bottom surface of the inner tray. When the computer is no longer needed, the procedure is reversed. This is a significant inconvenience for the user of the computer, because it affects the user every time the computer is put into, or taken from, the protective case.

It is believed that the protective case for a portable computer, as set forth herein, is neither taught nor rendered obvious by the prior art cited above.

SUMMARY OF THE INVENTION

It is an object of the present invention to provide a protective case for a portable computer such that the computer is protected from physical damage that may occur during transport or use. In particular, it is an object of the present invention to protect the computer from damage that may occur if it is accidentally dropped during operation.

It is an object of the present invention to provide a protective case for a portable computer such that the computer can be effectively operated while it is inside the case.

It is an object of the present invention to provide a protective case for a portable computer that does not interfere with normal operation of the computer.

It is an object of the present invention to provide a protective case of generic design, such that it may be used with a wide variety of portable computers.

It is an object of the present invention to provide a protective case for a portable computer that is compact and light in weight, thereby enhancing the portability of the computer in its protective case.

It is an object of the present invention to provide a protective case that particularly protects the imaging screen of a portable computer, whether the computer is in use or fully enclosed within the case for transport.

It is an object of the present invention to provide a protective case that offers a measure of privacy to the user of the computer, whenever it is operated while resting on the user's lap in a crowded location, such as in a classroom, or aboard an airplane. A related aspect of this object is to provide a protective case for a portable computer that reduces the incidence of bright ambient light on the imaging screen of the computer.

It is an object of the present invention to provide a protective case for a portable computer such that the computer may be safely and effectively used while the user is standing or walking.

The protective case of the present invention, as described herein, accomplishes these and other objects through a novel combination of design concepts and embodiments thereof. Specifically, the protective case of the present invention has been designed to remain around a portable computer at all times, except during maintenance of the computer. Thus, the protective case protects the computer from damage that might occur during use, during transportation, or during storage. The protective case has been designed to provide such protection without interfering with normal operation of the computer.

The protective case of the present invention is configured such that it surrounds a portable computer, and is separably attached to the computer. Separable attachment of the lid of the computer to the interior of the lid of the protective case, and separable attachment of the base of the computer to the interior of the base panel of the protective case may be accomplished by attaching strips of hook-and-loop material thereto. The case includes flexible hinge means, such that the lid of the protective case, which is separably attached to the lid of the computer, can be raised without interfering with the movement of the lid of the computer relative to its base.

The protective case of the present invention is comprised of structural components having various combinations of a rigid layer, a resilient layer, and one or more fabric layers. The rigid layer in each structural component maintains the flat configuration of each component, preventing collapse of the protective case if the latter should be dropped onto a hard surface, or if a heavy object is placed on top of the protective case. The resilient layer absorbs energy if the computer, encased in the protective case, should be dropped onto a hard surface. The fabric layer(s) provide convenient means of construction, by sewing, and a durable outside surface material similar to that widely used in suitcases.

A separable connecting means, preferably in the form of a zipper, is provided to close the protective case for storage or transport. The configuration of such means has been specifically developed to provide secure closure without interfering with opening of the computer within the protective case. Attaching the separable connecting means directly to the base panel of the protective case and to full-height gussets attached to the lid of the case enables easy access by the user of the computer to cable connectors or disk drives that may be incorporated into the front or sides of the computer. Further, this configuration provides ventilation for the computer, helping to remove heated air therefrom.

A carrying means, such as a handle or shoulder strap, is attached to the front of the protective case. An elastic support strap, attached to the exterior surface of the base panel of the protective case, enables the user of the computer to secure the computer (while encased in a protective case) to one wrist while he/she supports the computer with one hand and operates it with the other.

At least one rear flap in the protective case allows easy access by the user of the computer to cable connectors on the rear of the computer. Such a rear flap may contain a thick layer of resilient material on its interior surface, to offer additional protection to the computer, should it be dropped while being carried with its handle upward. Where the protective case includes two or more rear flaps, a gap therebetween encourages the ventilation of the computer.

Other objects and advantages of the present invention will be understood and appreciated by reference to the following detailed description of the invention, and the appended claims and drawings. It should be noted that like reference symbols in the drawings and related text indicate the same or similar components. It should also be noted that terminology referring to, or implying, orientation of either a portable computer or the protective case of the present invention describes orientation with respect to the position of a user, who has positioned the computer on his/her lap, or on a work area in front of himself/herself. Within the context of the present discussion, the term protective case comprehends a case for securely transporting and protecting a portable computer; the term also implies a case that is separate from the outer shell provided by the manufacturer of the computer as an integral part thereof.

DETAILED DESCRIPTION OF THE INVENTION

Figure 1:
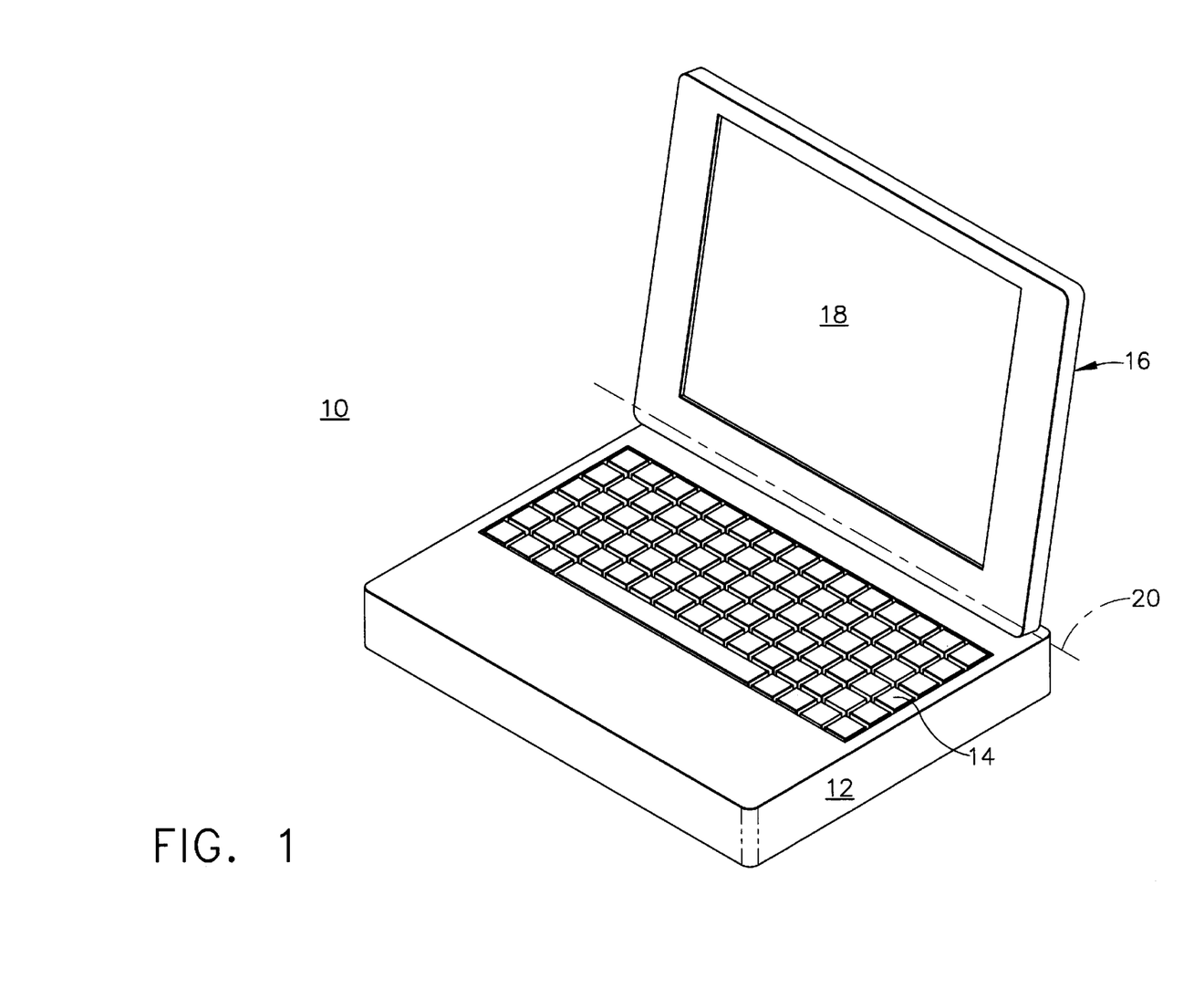
FIG. 1 illustrates, in schematic form, a portable computer. The drawing illustrates the base of the computer, which contains a keyboard, the essential electronic and electrical components of the computer, access for disk drives, means for connecting the computer to a source of electric power, and the like. The drawing also illustrates the lid of the computer, which contains an imaging screen that provides a visual output of the actions of the computer. The drawing further illustrates the hinged joint between the base and the lid.
Figure 2:
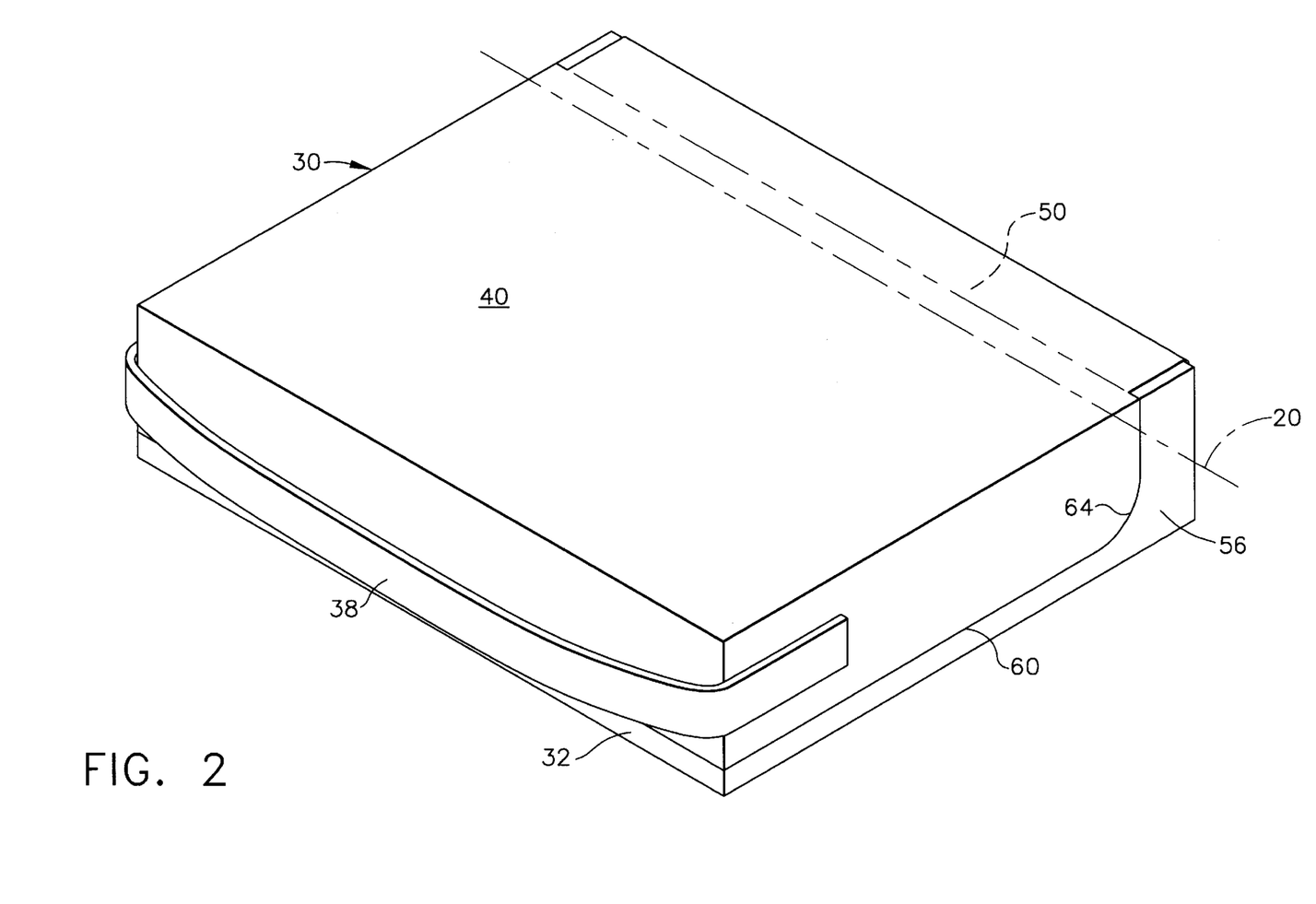
FIG. 2 illustrates, in schematic form, the protective case of the present invention. The drawing illustrates the appearance of the case in its closed configuration.
Figure 3:
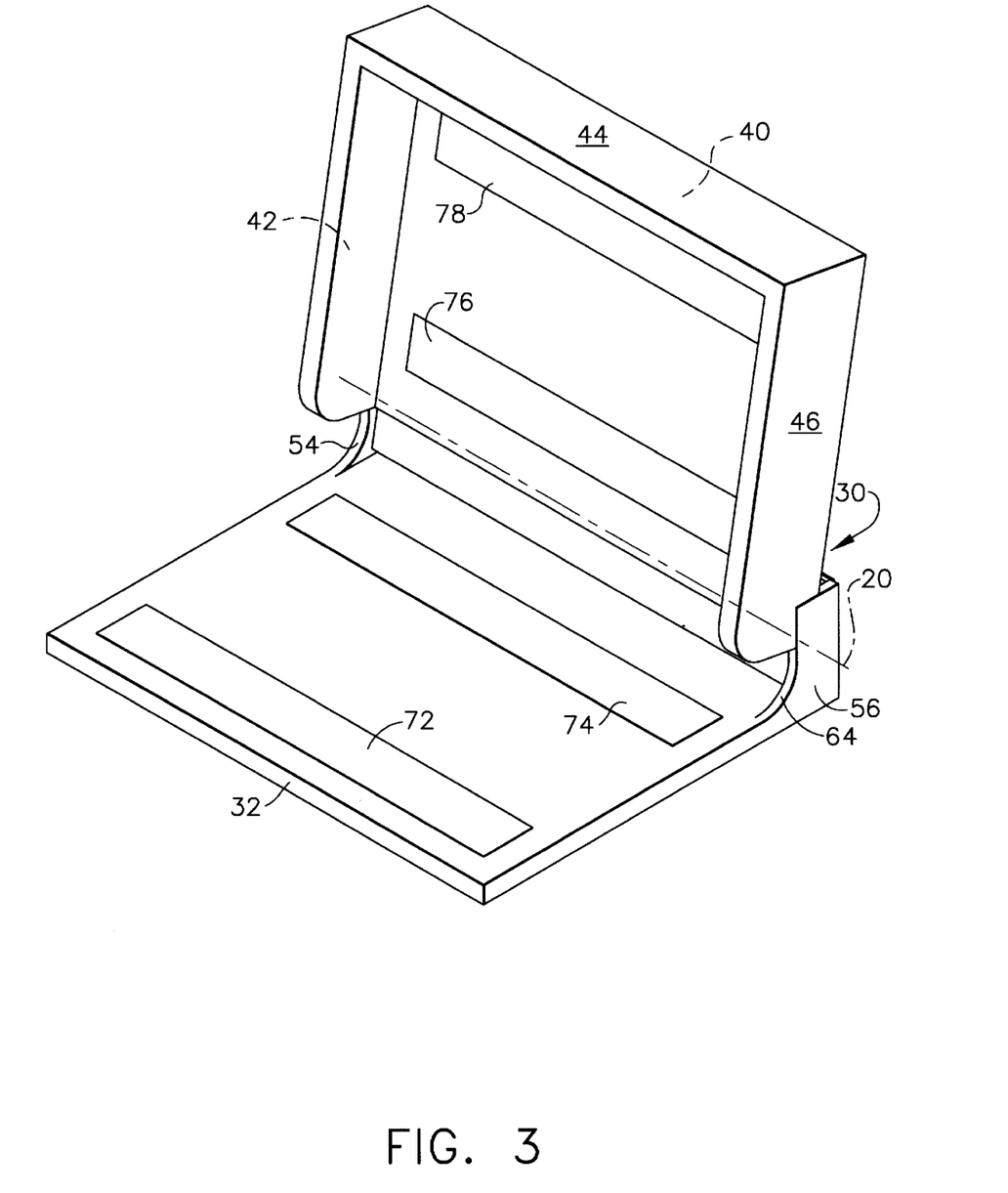
FIG. 3 illustrates, in schematic form, the protective case of the present invention. The drawing illustrates the appearance of the case in its open configuration.
Figure 4:
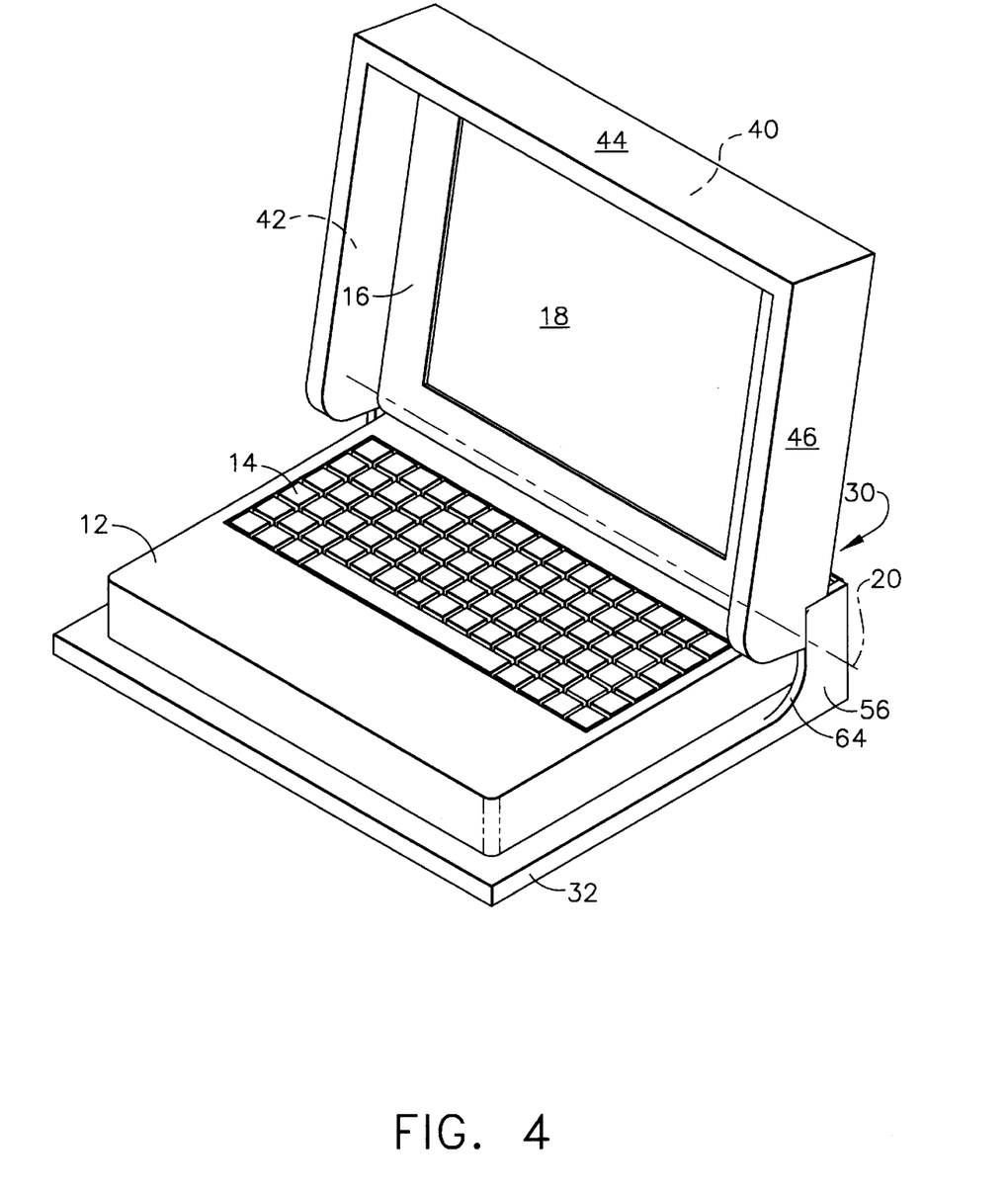
FIG. 4 illustrates, in schematic form, how a portable computer fits into the protective case of the present invention.

Because the present invention provides for a protective case for a portable computer, a brief discussion of some charateristics thereof is relevant. A typical laptop portable computer is shown schematically in FIG. 1, at 10. It is about 12 inches wide by 9½ inches front-to-back by 2 inches high. Smaller types of portable computer, identified above, have smaller dimensions. A laptop portable computer is comprised of two major components, a base, 12, which houses the major electrical and electronic components, a keyboard, 14, cable connectors and disk drives, and a lid, 16, which houses the imaging screen of the computer, 18. The base and lid of the computer are connected by a hinge, 20. The cable connectors and adapters for other accessories may be located on the rear of the base, or on either side; the disk drives may be located on the front or on either side. For clarity, these items are not shown in FIG. 1. Of the two-inch height of the computer, the base comprises approximately 1½ inches and the lid comprises approximately ½ inch. Thus, the hinge is typically located about ½ inch below the top surface of the lid.

A principal object of the present invention is to provide a protective case for a portable computer such that the computer can be effectively operated while it is inside the protective case. This object of the invention required development of several novel design features in the protective case. The overall configuration of the protective case of the present invention, and the novel features incorporated therein, is illustrated in FIGS. 2–5. The basic shape of the protective case, shown generally at 30, is a hollow rectangular box. The principal components of the protective case are a base panel 32, a lid 40 with lid gussets 42, 44 and 46, side walls 54 and 56, a flexible hinge 50, separable connector 60, and at least one rear flap 68. Separable means for attaching the protective case to the computer are provided at 72, 74, 76 and 78. These are preferably strips of hook-or-loop material, preferably sewn onto fabric coverings on the interior surfaces of the base panel 32 and lid 40. Additional strips of mating hook-or-loop material are attached to the base 10 and lid 16 of the computer; these strips are preferably provided with an adhesive to facilitate attachment thereof to the computer.

Attaching the computer to the interior of the protective case by strips of hook-and-loop material implies that the inside height of the protective case must be slightly greater than the height of the portable computer, by the thickness of the strips of hook-and-loop material. However, research leading to the present invention indicated that the case would provide better protection for the computer if an air space were provided between the computer 10 and the lid gussets 42, 44 and 46, and a slightly larger air space were provided between the computer 10 and the rear flap 68. Such an air space also provides ventilation for the computer. Accordingly, the base panel 32 and the lid 40 are made larger than the base of the computer 12. The base panel 32 is preferably made large enough so that it extends beyond the base of the computer 12 by at least ⅜ inch on the left side, front and right side, and by at least ½ inch in the rear. The dimensions are most preferably ½ inch and ¾ inch, respectively. The lid 40 is sized accordingly. The stated dimensions represent an effective compromise between compactness of the case and adequate protection and ventilation for the computer.

To further resist damage to the computer by accidentally dropping it onto a hard surface, and to resist damage resulting from placing a heavy load on top of the computer, the lid, lid gussets, base panel, side walls, and rear flaps are each comprised of a rigid layer and a resilient layer. For the base panel 32, the rigid layer is nearer to the interior of the protective case than the resilient layer, but for the other components, the resilient layer is nearer to the interior. The reason why the base panel is so designed is that some portable computers have ventilation ports through the bottom surfaces of their bases. A resilient layer adjacent to the base of such a portable computer might obstruct the ventilation ports. Otherwise, having the resilient layer adjacent to the computer offers cushioning against shock, should the computer be accidentally dropped. For convenience in assembly, a flexible layer of polymeric material, approximately 0.010 inch thick, may be inserted between the rigid and resilient layers. This flexible layer, shown in FIG. 5 at 88, may be comprised of polystyrene.

In order to allow the protective case to remain attached to the computer during use, it is necessary to provide flexibility in the structural components of the computer and/or its protective case. The need for such flexibility arises because the hinge axis 20 of the computer lid 16 relative to the computer base 12 cannot conveniently be made to coincide with any point on any rear flap 68 of the protective case. As the lid 16 and base 12 of the computer and the base panel 32 of the protective case are all substantially rigid elements, opening the computer and case attached thereto requires that the lid of the protective case 40 not only bend at some point near the hinge axis 20, but also become shorter, as measured in its front-to-back length. If no flexibility is provided for the system of portable computer and protective case, the system can be analyzed as a linkage of four rigid bars. As the linkage is operated in a manner analogous to opening the lid of the protective case and portable computer therein, the rigid bars representing the lids of the computer and the protective case must separate at the ends away from their respective front ends. The same effect occurs between bars representing the base of the computer and the base panel of the protective case. In the context of the present invention, this means that the rear of the case cannot remain attached to the rear of the computer as the combination is opened, absent some means for providing flexibility in at least one member in this system. It is because Song has apparently not considered this fundamental principle of machine design, and because of the lack of the requisite flexible member is his design, that his teaching is probably inoperable.

Figure 5:
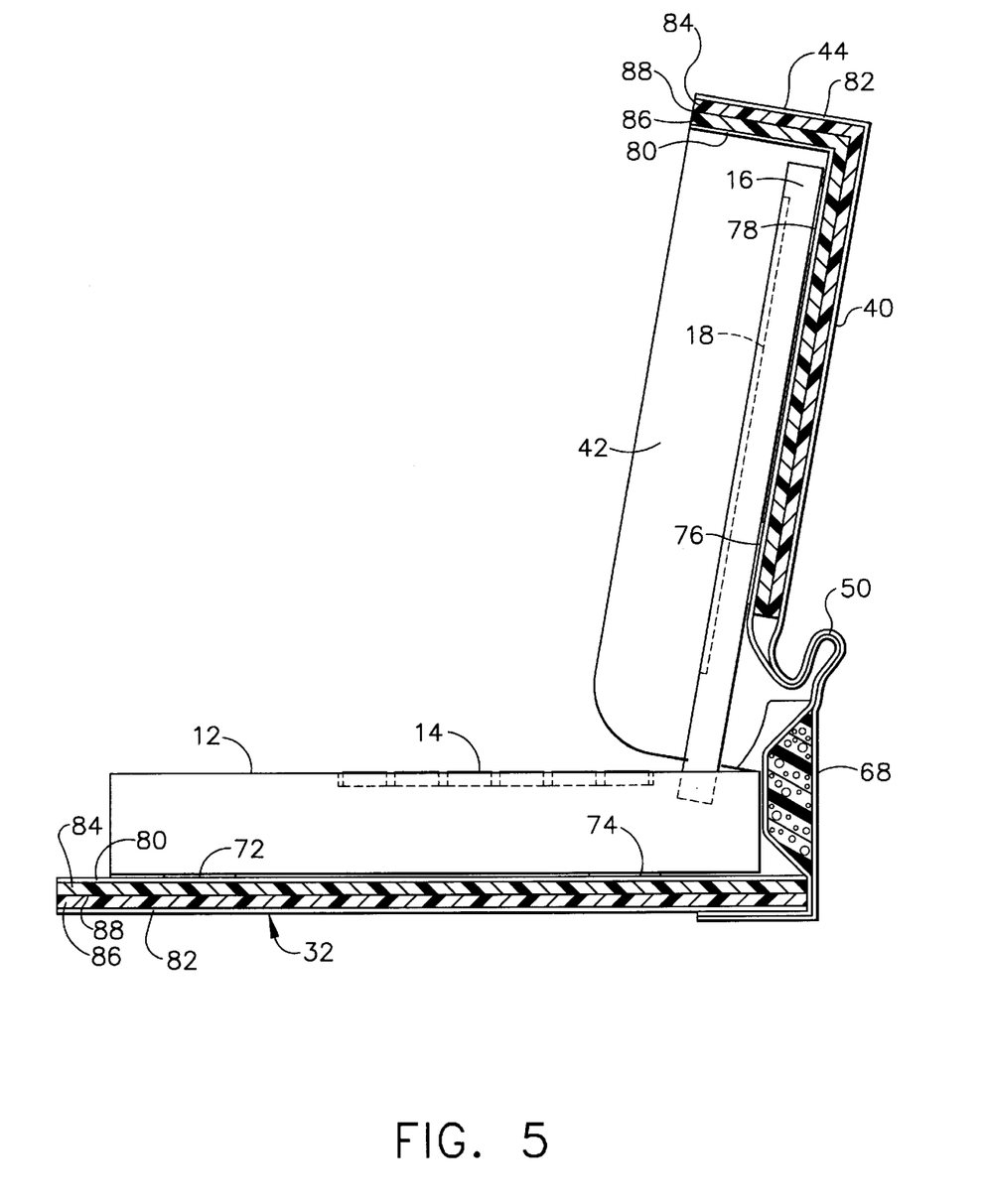
FIG. 5 illustrates, in schematic form, a cross section through the protective case and a portable computer encased therein. The drawing illustrates the various layers comprising the protective case. The drawing also illustrates the spatial relationship between the hinged joint of the computer and the flexible hinge means of the protective case.

To provide for sufficient flexibility for maintaining attachment between the protective case and a portable computer therein, a flexible hinge 50 has been incorporated into the design of the protective case of the present invention. The function of the flexible hinge is illustrated in FIG. 5. The design and construction of the flexible hinge incorporated into the present invention represent a significant advance over similar hinges known in the prior art, particularly with respect to preferred dimensions and materials of construction. The flexible hinge contains neither a rigid layer nor a resilient layer; rather, it consists only of the fabric layers used in the construction of the case, shown at 80 and 82. Thus, the hinge is fully capable of both bending and wrinkling, to provide the necessary flexibility. During the development of the present invention it was found that the front-to-back length of the flexible hinge had to be at least ½ inch to accommodate the motion of the lid of the portable computer. However, the length of the flexible hinge should be minimized, in order to minimize the depth of the protective case that does not include the protective rigid and resilient layers. The necessary length of the flexible hinge also depends on the design of the portable computer, and how it is situated within the protective case. The necessary length of the flexible hinge may also be expressed as being equal to, or slightly greater than, the distance between the top front edge of the lid of the computer to the top rear edge of the base of the computer, when the computer is closed, less the distance between the same points when the computer is opened to a normal operating position. That length is generally between ½ inch and 1¼ inches.

The lid 40 of the protective case is provided with lid gussets 42, 44 and 46 attached to the front, left side and right side, respectively, of the lid. At the left front corner of the lid, the front of the left lid gusset 44 is attached to the left side of the front lid gusset 42. At the right front corner of the lid, the front of the right lid gusset 46 is attached to the right side of the front lid gusset 42. The three lid gussets form a protective hood over the lid of the computer 16, and the fragile imaging screen 18 incorporated therein. This hood provides protection for the computer whether the computer and its protective case are open for use, or closed for transport or storage. The hood also offers the user a measure of privacy from persons who may be seated adjacent to the user, and it provides some reduction in the incidence of bright ambient light on the imaging screen. It is a preferred feature of the present invention that the lid gussets extend the full height of the protective case, from the base panel 32 to the lid 40. The full height lid gussets also provide other useful functions. Because of their full height, they eliminate the need for gussets attached to the base panel. They also permit easy access, whenever the protective case is opened, to the front and both sides of the base of the computer, where necessary user interfaces, such as cable connections, interface devices, disk drives and the like, are often situated. Also, because the front and both sides of the base of the computer are exposed to ambient air, ventilation of the computer is not restricted.

The preferred form of the separable connection 60 between the side walls 54 and 56 and base panel 32, and the lid gussets 44, 42 and 46 is a zipper, and the most preferred form is a zipper with two closure slides. During research leading to the present invention, it was found that the configuration of the zipper was critical to its functionality and ease of operations. Specifically, one end of the zipper 36 must be situated at a point of connection between the front of the right side wall 56 and the flexible hinge 50. The zipper is substantially vertical along the front of right side wall 56 to a point where its configuration becomes arcuate, near the intersection of the front of the right side wall 56 with the base panel 32. The zipper is essentially horizontal along the right edge, the front, and the left edge of the base panel 32. Near the intersection of the left side wall 54 and the base panel 32, the configuration of the zipper is arcuate. The zipper is substantially vertical between the latter arcuate section and a point of connection between the front of the left side wall 54 and the flexible hinge 50. Relative to the lid 40 of the protective case, the configuration of the zipper is along the rear and bottom of the right lid gusset 46, along the bottom of the front lid gusset 42 and along the bottom and rear of the left lid gusset 44. The preceding description illustrates the attachments of the two separable portions of the zipper to the base panel 32 and lid 40, respectively.

Research leading to the present invention indicated that the preferred radius of the arcuate portions of the zipper configuration, one of which is shown at 64, represent a compromise. A small radius enhances access to necessary user interfaces, while a large radius facilitates stitching the mating portions of the zipper to different components of the case. Radii between about ½ inch and about 1½ inches have been found preferable for this invention.

At least one rear flap, shown at 68, is an important aspect of the present invention. It provides access to the rear of the computer, where cable connections are sometimes located, and it enhances ventilation of the computer. Gaps between the rear flap 68 and the rear of the side walls 54 and 56 provides a pathway for ventilation, and also a pathway for cables used with the computer. A preferred embodiment of the present invention provides two rear flaps. In this embodiment, the user may choose to open one rear flap without opening the other, thereby maintaining protection for the computer. Also, a gap between two rear flaps, preferably 1/4 inch or greater, provides an additional pathway for ventilation or cables. As the protective case (and portable computer therewithin) is generally carried with the rear flap disposed downwardly, the thickness of the resilient layer in the rear flap is preferably greater than that of the resilient layer in other components of the protective case. The extra thickness of the resilient layer provides additional protection for the computer, should in be dropped onto a hard surface.

In a preferred embodiment of the present invention, the lid 40, flexible hinge 50 and rear flap 68 are fabricated as a subassembly, with fabric layers on the interior and exterior surfaces thereof, shown in FIG. 5 at 80 and 82, respectively, and with rigid and resilient layers disposed therebetween in the lid and rear flap sections, at 84 and 86, respectively. The rear flap is preferably separably connected to the rear of the base panel 32, preferably to its exterior surface, by hook-and-loop material strips. For some applications, it might be preferable to fabricate the base panel 32 and rear flap 68 as a subassembly, and provide for separable connection of the rear flap 68 to the flexible hinge 50 by hook-and-loop material strips.

The materials employed in preferred embodiments of the present invention have been carefully selected for light weight, durability and resistance to moisture. The material for the rigid layers 84 is preferably corrugated polymeric material, such as Coroplast, a product of Coroplast Company. Other materials, such as corrugated paper, compressed wood fiber or metal sheet, could be employed, but would not be deemed preferred embodiments of the invention. The material for the resilient layers 86 is preferably a polymeric foam material, such as polyethylene or polyurethane foam. The preferred material is a fairly dense grade of polyethylene foam. The preferred material for a fabric layer on the exterior of the protective case 82 is similar to that used in manufacturing suitcases. It is a heavy-duty fabric, typically made of nylon, polyester or polyvinyl chloride. It is often bonded to a thin polymeric foam backing, which improves its durability and water tightness. A lightweight, tightly woven nylon fabric is preferred for a fabric layer on the interior of the protective case 80. In another embodiment of the present invention, natural leather, synthetic leather or a sheet polymeric material such as polyvinyl chloride could be substituted for either or both of the two fabric layers.

While the present invention has been heretofore described as constructed from fabric, together with rigid and resilient layers, a functionally similar protective case could be constructed from a rigid shell, with resilient materials incorporated inside the shell. It would also be possible to fibricate such a protective case from molded polyethylene foam with cloth coverings bonded to both sides. Such a case would probably have to be designed specifically for a particular model of portable computer, because it would be difficult to duplicate the action of the flexible hinge during opening and closing of the case. This would differ from a heavy-duty shell provided by the computer manufacturer as the sole casing of the computer, because the computer could be removed from the case as desired.

Means for carrying the protective case, and a portable computer therein, may include a handle, shown at 38, is preferably attached to left and right lid gussets, 44 and 46. Alternatively, carrying means could be attached to the front lid gusset 42. A shoulder strap, not shown, may be attached to the left and right lid gussets, 44 and 46. A harness, optionally attached to the left and right side walls and the front of the base panel, and worn around the neck and/or shoulders of the user, would support the computer, thereby facilitating operation in the standing position. An elastic strap, attached to the exterior surface of the base panel at the front and back thereof, is provided to secure the computer and protective case to one wrist of the user, while he/she operates the computer with the other hand.

In several applications in the present invention, separable attachment is conveniently achieved through the use of mating pieces of what is termed herein as hook-and-loop material, or hook-or-loop material, depending upon the context of the description. To briefly characterize the hook-and-loop material system, it is comprised of two pieces of material, one having loops of polymeric filament material woven thereinto and the other having hooks of polymeric filament material woven thereinto. The former may be termed loop-type and the latter hook-type material. When two such pieces of material are pressed together, the hooks on one piece of material engage the loops on the other. Those two pieces of material may be collectively described as mating pieces of hook-and-loop material. If the context of the description admits to the attachment of a piece of material, either hook-type of loop-type, to some substrate, it may be described as hook-or-loop material. To effect a separable connection, it is necessary that a mating piece of the other type of material be attached to another substrate object. Hook-and-loop materials are conveniently attached to substrate materials by sewing, by adhesive bonding, and by other means. This material is frequently identified by the trade name for one such product, Velcro; that trade name is frequently used in a generic sense for any such product.

The protective case of the present invention is distinguished over the prior art by a novel combination of features. Specifically, the protective case of the present invention includes, in its various embodiments: (1) means for attaching the protective case to a portable computer, so that it can remain there while the computer is being used, stored or transported; (2) an improved flexible hinge means that can accommodate the relative motion between the protective case and the computer while the computer is being opened or closed; (3) a base panel that is larger than the computer, to provide protection when the protective is closed and access to the sides and front of the computer when the protective case is open, and to enhance ventilation of the computer; (4) full height lid gussets; (5) zipper closures having arcuate segments to facilitate manufacture and use of the zippers; (6) rear flaps to provide access to the rear of the computer, and to enhance ventilation of the computer; (7) components of the protective case that combine rigidity, shock absorbing and resistance to damage but abrasion or cutting; (8) means for conveniently carrying the computer in its protective case; (9) means for supporting the computer on the operator's arm during operation; and (10) easy opening and closing of the protective case to facilitate setting up or closing the computer and protective case ached thereto.

Although the present invention has been described with reference to certain preferred embodiments, it will be appreciated that the present invention is not limited thereby. In particular, the concepts of the present invention are fully applicable to protective cases for notebook computers, sub-notebook computers, or palmtop computers, all of which are similar to, but smaller than, the laptop computer described hereinabove. Those skilled in the art will recognize that minor variations and modifications in the design and construction of a protective case for a portable computer, as described herein, still lie within the spirit and scope thereof, and such variations and modifications properly fall within the scope of the present invention, which is defined by the following claims.

I claim:

1. A protective case for a portable computer, comprising:
a) a base panel, having a front, a rear, a left side and a right side;
b) a lid, having a front, a rear, a left side and a right side;
c) flexible hinge means, attached to the rear of the lid, and having a left side, a right side and a rear;
d) two side walls, a left side wall connecting the left side of the base panel to the left side of the flexible hinge means, and a right side wall connecting the right side of the base panel to the right side of the flexible hinge means, each side wall having a front and a rear;
e) three lid gussets, a left lid gusset attached to the left side of the lid and having a front and a rear, a right lid gusset attached to the right side of the lid and having a front and a rear, and a front lid gusset attached to the front of the lid and having a left side and a right side, wherein the front of the left lid gusset is attached to the left side of the front lid gusset and the front of the right lid gusset is attached to the right side of the front lid gusset;
f) at least one rear flap, flexibly connected to the rear of the flexible hinge means and separably connected to the rear of the base panel;
g) separable connecting means, whereby the front of the left side wall is separably connected to the rear of the left lid gusset, the left lid gusset is separably connected to the left side of the base panel, the front lid gusset is separably connected to the front of the base panel, the right lid gusset is separably connected to the right side of the base panel, and the right side wall is separably connected to the rear of the right lid gusset;

wherein the base panel, the lid, the flexible hinge means, the side walls, the lid gussets, and the rear flap each has an interior surface and an exterior surface; and wherein the protective case additionally comprises separable means for attaching the interior surface of the lid to a lid of the portable computer and separable means for attaching the interior surface of the base panel to a bottom of the portable computer.

2. The protective case for a portable computer as recited in claim 1, wherein the base panel, the lid, the side walls, the lid gussets and the rear flap each comprises a rigid layer and a resilient layer.

3. The protective case for a portable computer as recited in claim 2, wherein the base panel consists of a fabric layer on the interior surface, a rigid layer adjacent thereto, a resilient layer and a fabric layer on the exterior surface, and wherein all other recited components consist of a fabric layer on the interior surface, a resilient layer adjacent thereto, a rigid layer and a fabric layer on the exterior surface.

4. The protective case for a portable computer as recited in claim 3, where at least one recited component additionally includes a flexible layer disposed between the rigid layer and the resilient layer.

5. The protective case for a portable computer as recited in claim 2, wherein the rigid layer consists of a corrugated polymeric material and wherein the resilient layer consists of a polymeric foam material.

6. The protective case for a portable computer as recited in claim 1, wherein the base panel, the lid, flexible hinge means, the side walls, the lid gussets and the rear flap each comprises a fabric layer.

7. The protective case for a portable computer as recited in claim 1, wherein the separable connecting means comprises a zipper.

8. The protective case for a portable computer as recited in claim 7 wherein a first separable portion of the zipper is continuous from a point of connection between the left side wall and the left side of the flexible hinge means, along the front of the left side wall, along the left side of the base panel, along the front of the base panel, along the right side of the base panel, along the front of the right side wall, to a point of connection between the right side wall and the right side of the flexible hinge means, and attached thereto, and wherein a second parable portion of said zipper is continuous from the point of connection between the left side wall and the left side of the flexible hinge means, along the rear and a bottom of the left lid gusset, along a bottom of the front lid gusset, along a bottom and the rear of the right lid gusset, to the point of connection between the right side wall and the right side of the flexible hinge means, and attached thereto.

9. The protective case for a portable computer as recited in claim 8, wherein the zipper has an arcuate configuration at a point of connection between the left side wall and the left side of the base panel and an arcuate configuration at a point of connection between the right side wall and the right side of the base panel.

10. The protective case for a portable computer as recited in claim 7, wherein the zipper is provided with two closure slides.

11. The protective case for a portable computer as recited in claim 1, wherein the separable means for attaching comprises a strip of Velcro attached to the interior surface and a mating strip of Velcro provided with means for attachment to the portable computer.

12. The protective case for a portable computer as recited in claim 1, wherein carrying means is attached to the exterior surface of at least one lid gusset.

13. The protective case for a portable computer as recited in claim 1, wherein a storage pocket is attached to the exterior surface of the lid.

14. The protective case for a portable computer as recited in claim 1, wherein a support strap is attached to the exterior surface of the base panel.

15. The protective case for a portable computer as recited in claim 1, wherein the flexible hinge means extends a distance of at least one-half inch from its rear to its attachment to the rear of the lid.

16. The protective case for a portable computer as recited in claim 1, wherein the protective case comprises two rear flaps, and wherein the two rear flaps are separated from each other by a gap of not less than one-quarter inch in extent.

17. The protective case for a portable computer as recited in claim 1, wherein the means for separably connecting the rear flap to the rear of the base panel comprises mating strips of Velcro.

18. The protective case for a portable computer as recited in claim 1, wherein the base panel is larger than the base of the portable computer by at least three-eighths of an inch on the left side, front and right side thereof, and by at least one-half inch on the rear thereof.

19. The protective case for a portable computer as recited in claim 1, wherein the rear flap is flexibly connected to the base panel and separably connected to the flexible hinge means.

20. A protective case for a portable computer;

wherein said computer comprises:

a base, having a bottom, left and right sides, front and rear portions and a top surface, and having a keyboard incorporated in the top surface thereof;

a lid, having a top, left and right sides, front and rear portions and a bottom surface, and having an imaging screen incorporated in the bottom surface thereof; and hinge means for pivotably securing the rare portion of the rear portion of the base;

wherein the computer may be disposed in a closed condition in which access to the keyboard and imaging screen is precluded by the close proximity of the keyboard to the imaging screen; and wherein the computer may be alternatively disposed in an open condition which provides access to the keyboard and imaging screen;

said protective case comprising:

a base panel, having left and right sides, front and rear portions, an interior surface and an exterior surface;

a lid, having left and right sides, front and rear portions, an interior surface and an exterior surface;

connecting means for flexibly joining the rear portion of the lid to the rear portion of the base panel, wherein the connecting means comprises a flexible structure that provides bending and wrinkling therein; and separable means for securing the computer within the protective case by securing the interior surface of the lid of the protective case to the top of the lid of the computer and for securing the interior surface of the base panel of the protective case to the bottom of the base of the computer;

wherein the flexible structure of the connecting means provides for the computer to remain secured within the protective case when the computer is disposed in its open and closed conditions, and during redisposition therebetween.

21. The protective case for a portable computer, as recited in claim 20, wherein the flexible structure comprises flexible hinge means in the rear portion of the lid.

22. The protective case for a portable computer, as recited in claim 20, additionally comprising two side walls, a left side wall connecting the left side of the base panel to the left side of the lid, and a right side wall connecting the right side of the base panel to the right side of the lid, each side wall having a front and a rear, wherein the rear of each side wall is proximate to the rear portions of the lid and base panel, respectively.

23. The protective case for a portable computer, as recited in claim 20, additionally comprising at least one rear flap, flexibly connected to the rear of the lid and separably connected to the rear of the base panel.

24. The protective case for a portable computer, as recited in claim 20, additionally comprising three lid gussets, a left lid gusset attached to the left side of the lid and having a front and a rear, a right lid gusset attached to the right side of the lid and having a front and a rear, and a front lid gusset attached to the front of the lid and having a left side and a right side, wherein the front of the left lid gusset is attached to the left side of the front gusset and the front of the right lid gusset is attached to the right side of the front lit gusset.

25. The protective case for a portable computer, as recited in claim 24, additionally comprising separable connecting means, whereby the front of the left side wall is separably connected to the rear of the left lid gusset, the left lid gusset is separably connected to the left side of the base panel, the front lid gusset is separably connected to the front of the base panel, the right lid gusset is separably connected to the right side of the base panel and the front of the right side wall is separably connected to the rear of the right lid gusset.

26. The protective case for a portable computer, as recited in claim 25, wherein the separable connecting means comprises a zipper.

27. The protective case for a portable computer, as recited in claim 25, wherein the base panel, the lid, the side walls and the lid gussets each comprises a rigid layer and a resilient layer.

28. The protective case for a portable computer, as recited in claim 27, wherein the base panel consists of a fabric layer on the interior surface, a rigid layer adjacent thereto, a resilient layer and a fabric layer on the exterior surface, and wherein all other recited components consist of a fabric layer on the interior surface, a resilient layer adjacent thereto, a rigid layer and a fabric layer on the exterior surface.

29. The protective case for a portable computer, as recited in claim 20, additionally comprising carrying means attached thereto.

30. The protective case for a portable computer, as recited in claim 26, wherein the separable means for securing the computer within the protective case comprises strips of Velcro attached to the inner surfaces of the lid and the base panel, respectively, and mating strips of Velcro provided with means for attachment to the top of the lid and the bottom of the base of the computer.

31. A combination of a portable computer and a protective case therefor, comprising:

a portable computer, comprising
 a base, having a bottom, left and right sides, front and rear portions and a top surface, and having a keyboard incorporated in the top surface thereof;
 a lid, having a top, left and right sides, front and rear portions and a bottom surface, and having an imaging screen incorporated in the bottom surface thereof; and
 hinge means for pivotably securing the rear portion of the lid to the rear portion of the base;
 wherein the computer may be disposed in a closed condition in which access to the keyboard and imaging screen is precluded by the close proximity of the keyboard to the imaging screen; and
 wherein the computer may be alternatively disposed in an open condition which provides access to the keyboard and imaging screen;

a protective case, comprising
 a base panel, having left and right sides, front and rear portions, an interior surface and an exterior surface;
 a lid, having left and right sides, front and rear portions, an interior surface and an exterior surface;
 connecting means for flexibly joining the rear portion of the lid to the rear portion of the base panel, wherein the connecting means comprises a flexible structure that provides bending and wrinkling therein; and separable means for securing the computer within the protective case by securing the interior surface of the lid of the protective case to the top of the lid of the computer and for securing the interior surface of the base panel of the protective case to the bottom of the base of the computer;

wherein the flexible structure of the connecting means provides for the computer to remain secured within the protective case when the computer is disposed in its open and closed conditions, and during redisposition therebetween.

* * * * *

UNITED STATES PATENT AND TRADEMARK OFFICE
CERTIFICATE OF CORRECTION

PATENT NO.   : 6,109,434
DATED           : August 29, 2000
INVENTOR(S) : William E. Howard, Jr.

It is certified that error appears in the above-identified patent and that said Letters Patent is hereby corrected as shown below:

Column 9,
Line 18, delete "fibricate" and insert -- fabricate --.

Column 12,
Line 41, delete "rare portion" and insert -- rear portion of the lid to --.

Column 14,
Line 5, delete "26" and insert -- 20 --.

Signed and Sealed this

Ninth Day of April, 2002

Attest:

Attesting Officer

JAMES E. ROGAN
Director of the United States Patent and Trademark Office